(12) United States Patent
Lee

(10) Patent No.: US 11,319,518 B2
(45) Date of Patent: May 3, 2022

(54) BEVERAGE MAKER

(71) Applicant: LG ELECTRONICS INC., Seoul (KR)

(72) Inventor: Jeyeol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/671,620

(22) Filed: Nov. 1, 2019

(65) Prior Publication Data

US 2020/0140796 A1 May 7, 2020

(30) Foreign Application Priority Data

Nov. 5, 2018 (KR) .................. 10-2018-0134558

(51) Int. Cl.
| | |
|---|---|
| *C12C 13/10* | (2006.01) |
| *G06F 3/0482* | (2013.01) |
| *G06F 3/14* | (2006.01) |
| *C12G 3/02* | (2019.01) |

(52) U.S. Cl.
CPC .............. *C12C 13/10* (2013.01); *C12G 3/02* (2013.01); *G06F 3/0482* (2013.01); *G06F 3/14* (2013.01)

(58) Field of Classification Search
CPC ......... C12C 13/10; C12G 3/02; G06F 3/0482; G06F 3/14
See application file for complete search history.

(56) References Cited

U.S. PATENT DOCUMENTS

| | | | |
|---|---|---|---|
| 2016/0077678 A1* | 3/2016 | Reese | F24C 7/08 99/342 |
| 2017/0325621 A1* | 11/2017 | Herbert | A47J 31/52 |
| 2018/0110360 A1* | 4/2018 | Chowdhury | A47J 31/52 |
| 2018/0129360 A1* | 5/2018 | Suh | H04M 1/72412 |
| 2018/0129380 A1* | 5/2018 | Suh | G06F 40/117 |
| 2018/0180293 A1* | 6/2018 | Holzinger | G06F 3/0416 |

OTHER PUBLICATIONS

Asmita P. Bodale et al., Beverages in Dispenser Machine according to Capsule Identification with Barcode, Aug. 1, 2017, IEEE, pp. 1-6 (Year: 2017).*

Tao Xu et al., The Design of Intelligent Multimedia Automatic Beverage Machine Control System, Mar. 1, 2010, IEEE Computer Society, pp. 844-847 (Year: 2010).*

* cited by examiner

*Primary Examiner* — Tam T Tran
(74) *Attorney, Agent, or Firm* — Ked & Associates LLP

(57) ABSTRACT

A beverage maker may include a fermentation tank defining a space to make a beverage therein; a display; an input interface configured to receive recipe information of a beverage to be made in the fermentation tank; and a controller configured to set a making environment of the beverage based on the received recipe information, and to control a making function of the beverage based on the set making environment. The controller may be configured to receive a recipe check request through the input interface, and to display the recipe information through the display based on the received recipe check request.

17 Claims, 8 Drawing Sheets

BEVERAGE MAKER

CROSS-REFERENCE TO RELATED APPLICATION(S)

This application claims priority under 35 U.S.C. 119 and 365 to Korean Patent Application No. 10-2018-0134558, filed in Korea on Nov. 5, 2018 in the Korean Intellectual Property Office, the disclosure of which is incorporated herein by reference.

BACKGROUND

1. Field

A beverage maker, and more particularly, a beverage maker which provides recipe information input to make a beverage and information related thereto to a user is disclosed herein.

2. Background

Beverages are collectively referred to as drinkable liquids, such as alcohol or tea, for example. Beverages may be divided into various categories, such as water (a beverage) to solve thirst, juice beverages with unique flavor and taste, refreshing beverages giving a refreshing sensation, favorite beverages with an arousal effect, or alcoholic beverages with an alcohol effect, for example.

A representative example of such a beverage is beer. Beer is an alcoholic beverage produced by making juice of malt, which is made by sprouting barley, filtering the juice, adding hop, and fermenting yeast.

Consumers may purchase ready-made products made and sold by a beer maker or make home beer (hereinafter "homemade beer") produced by directly fermenting beer ingredients at home or in a bar. Homemade beer may be made in a variety of types rather than ready-made products and may be made to better suit a consumer's taste.

The ingredients for making beer may include water, liquid malt, hop, yeast, and flavoring additive, for example. Leaven, which is called yeast, may be added to liquid malt to ferment the liquid malt and assist production of alcohol and carbonic acid. The flavor additives are additives that enhance the taste of beer, such as fruit, syrup, and vanilla beans, for example.

Generally, homemade beer may include three stages or operations, namely, a wort production operation, a fermentation operation, and an aging operation, and it may take about two to three weeks from the wort production operation to the aging operation. It is important for homemade beer to maintain an optimum temperature during the fermentation stage, and the more the beer is more simply made, the more user convenience is improved.

In recent years, a beverage maker capable of easily making a beer-like beverage in a home or a bar has been gradually used, and such a beverage maker is configured to be convenient.

BRIEF DESCRIPTION OF THE DRAWINGS

Embodiments will be described in detail with reference to the following drawings in which like reference numerals refer to like elements, and wherein.

DETAILED DESCRIPTION

Figure 1:
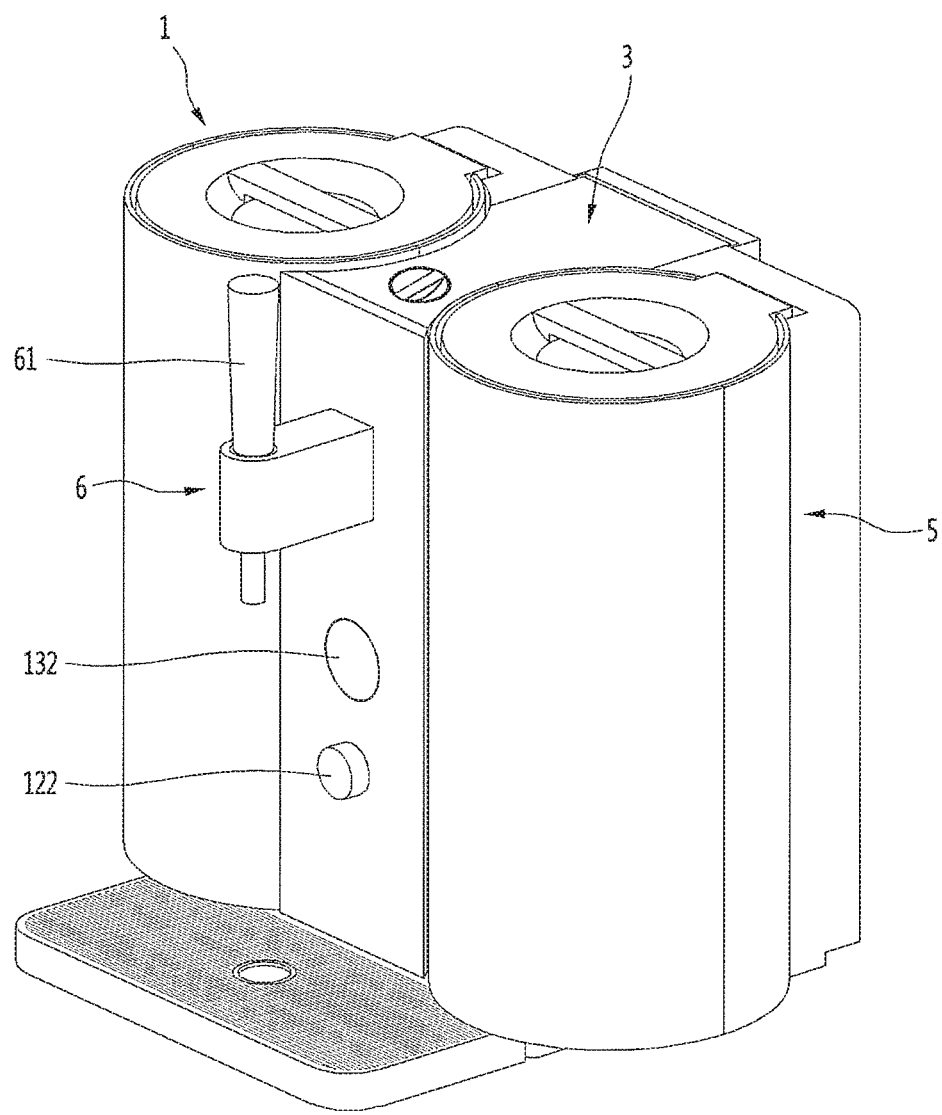
FIG. 1 is a perspective view of a beverage maker according to an embodiment.

Hereinafter, embodiments will be described with reference to the accompanying drawings. Wherever possible, the same or like reference numerals have been used to indicate the same or like elements, and repetitive disclosure has been omitted.

Although beer is exemplified as a beverage made by using a beverage maker according to embodiments, the kind of beverage capable of being made using the beverage maker is not limited to beer. For example, various kinds of beverages may be made using the beverage maker according to embodiments.

FIG. 1 is a perspective view of a beverage maker according to an embodiment. The beverage maker may include a fermentation module 1. In the fermentation module 1, a process such as fermentation of a beverage may be performed to make a beverage, and the made beverage may be stored.

The fermentation module 1 may include a fermentation tank having an inner space formed therein. That is, a beverage may be made in the fermentation tank, and the made beverage may be stored.

The beverage maker may include various components to make the beverage. For example, the beverage maker may include a thermostat to control a temperature inside of the fermentation module 1, a gas exhauster to adjust a pressure, a temperature sensor to detect a temperature inside of the fermentation module 1, and a pressure sensor to detect a pressure inside of the fermentation module 1.

The beverage maker may include a fluid supply module 5. The fluid supply module 5 may supply a fluid, such as water necessary for making the beverage to the fermentation module 1.

The beverage maker may include an ingredient supplier 3 containing at least some of ingredients necessary for making the beverage. The ingredient supplier 3 may be connected with the fermentation module 1. Accordingly, ingredients contained in the ingredient supplier 3 may be input into the fermentation module 1 based on an input time of each ingredient when the beverage is made.

The beverage maker may include a beverage dispenser 6 to dispense the beverage made in the fermentation module 1 to the outside. The beverage dispenser 6 may dispense the beverage to the outside based on an operation of a lever 61 by a user.

The beverage maker may include an input interface to receive input of a command related to beverage making by the beverage maker. The input interface may include at least one of a touch pad which receives an input of a user's command in a touch method, a rotary knob which is held and is rotated by the user, and/or a button which is pressed by the user, for example.

For example, the input interface may include a rotary knob 122. The rotary knob 122 may be disposed on a front surface of the beverage maker. For example, the rotary knob 122 may be disposed lower than a display 132; however, embodiments are not limited thereto.

The rotary knob 122 may function as a button which is pressed by the user. That is, the user may input a control command by holding and turning the rotary knob 122, or by pressing a front surface of the rotary knob 122.

The input interface may include a touch pad 124 to receive input of a user's command in a touch method. For example, the touch pad 124 may be integrally formed with the display 132. In this case, the display 132 may also function as a touch screen.

The beverage maker may include the display 132 to display a variety of information of the beverage maker. For example, the display 132 may be formed at a position where the display 132 is not hidden by the beverage dispenser 6 on the front surface of the beverage maker, such that the display 132 may be easily checked by the user with the naked eye.

Figure 2:
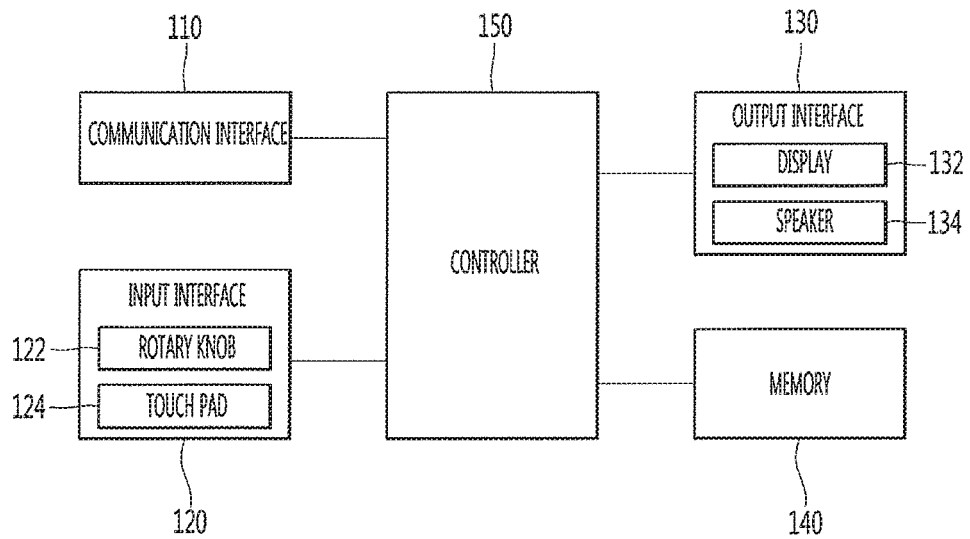
FIG. 2 is a schematic block diagram illustrating a control configuration of a beverage maker according to an embodiment.

FIG. 2 is a schematic block diagram illustrating a control configuration of a beverage maker according to an embodiment. Referring to FIG. 2, the beverage maker may include a communication interface 110, an input interface 120, an output interface 130, a memory 140, and a controller 150. The control components illustrated in FIG. 2 are not essential for implementation of the beverage maker, and the beverage maker may include more components or fewer components according to an embodiment.

The beverage maker may include the communication interface 110 to communicate with a terminal, such as a smartphone, and/or a tablet PC, for example, or a server. For example, the controller 150 may receive a request for execution of the beverage making function from a terminal of the user, or may receive recipe information through the communication interface 110. In addition, the controller 150 may transmit a variety of information regarding operations of the beverage maker, a making state of the beverage, and/or a storage state to the terminal or the server through the communication interface 110, for example.

The communication interface 110 may include a module that supports at least one of already-known various wired or wireless communication methods. For example, the communication interface 110 may include a module of short-range wireless communication, such as Bluetooth, or near field communication (NFC), for example, or a wireless Internet module, such as a wireless local area network (WLAN) module, for example.

The input interface 120 may be provided to receive various requests or commands from the user. For example, the input interface 120 may include the rotary knob 122, the touch pad 124 (or touch screen), and/or other buttons or a microphone, for example. The controller 150 may receive a request for execution of a beverage making function, recipe information, and/or control commands regarding various operations of the beverage maker, for example, through the input interface 120.

The output interface 130 may output a variety of information related to an operation or a state of the beverage maker, and a variety of information related to a beverage which is being made or stored in the beverage maker, for example. For example, the output interface 130 may include the display 132 to output the information in the form of a graphic or text, and a speaker 134 to output the information in the form of a voice; however, embodiments are not limited thereto.

More specifically, the display 132 may display various screens related to operations of the beverage maker. For example, the display 132 may display a screen including information related to a current operation of the beverage maker, various menu screens for executing a specific operation of the beverage maker, and/or a screen including information related to a beverage which is being made or stored in the beverage maker.

The display 132 may be implemented using a liquid crystal display (LCD), a light emitting diode (LED) display, and/or an organic LED (OLED) display, for example. In the following description, it is assumed that the display 132 is formed in a circular shape; however, embodiments are not limited thereto and the shape of the display 132 may be freely changed.

The controller 150 may output recipe information, which is input by a user when a beverage is made, through the display 132, in the middle of or while preparing to make the beverage, making the beverage, or storing the beverage. As it is difficult for the user to remember input recipe information for a long time, the user may check ingredients of the beverage or a beverage characteristic, such as a level of carbonic acid, for example, through the recipe information output through the display 132 of the beverage maker. In addition, the user may obtain detailed information regarding items (ingredients) included in the recipe information through the beverage maker.

The user may check the characteristics of the beverage based on the output recipe information, the detailed information, and/or drinking of the made beverage. The user may input recipe information by referring to the recipe information and the detailed information when the user makes a different beverage afterward, and accordingly, a user's favorite beverage may be made easily.

Embodiments will be described below with reference to FIGS. 3 to 10.

The memory 140 may store a variety of information or data related to operations of the beverage maker. For example, the memory 140 may store predetermined recipe information regarding beverages to be made, various setting values, and/or various program data for operations of the beverage maker. In addition, the memory 140 may store various graphic data related to the screens displayed through the display 132.

The memory 140 may store information related to each of ingredients which may be included in recipe information, and/or information related to a beverage characteristic (hereinafter, referred to as "detailed information"). When any one of items of recipe information displayed on the display 132 is selected by the user, the controller 150 may output detailed information of the selected item through the display 132. Each of the items may correspond to any one of ingredients included in the recipe information or may correspond to a beverage characteristic included in the recipe information.

The controller 150 may control overall operations of the beverage maker. The controller 150 may refer to at least one controller. The at least one controller may be implemented using hardware, such as a CPU, an application processor, a micro-computer (or mi-com), and/or an integrated circuit, for example.

When making a beverage using the beverage maker, the user may select any one of a plurality of recipes registered at the beverage maker, or may input recipe information by directly setting ingredients and a characteristic, such as a level of carbonic acid, for example, of the beverage to be made. As information regarding the already registered recipes is stored in the memory 140, the user is not required to remember the recipes. However, as recipe information directly input by the user is not stored in the memory 140, the user should remember the recipe information when the user wants to make the same beverage afterward or wants to make a different beverage by changing a portion of the recipe information.

However, as a few days or more are generally required to make a beverage, the user may not remember the input recipe information during the corresponding period or after the corresponding period, and there may be inconvenience in that the user may not easily make the same beverage or a different beverage by changing a portion of the recipe information afterward. To solve these problems, the beverage maker according to an embodiment may output the recipe information input by the user through the display 132, for example, thereby enhancing user convenience.

Embodiments regarding this will be described with reference to FIGS. 3 to 10.

Figure 3:
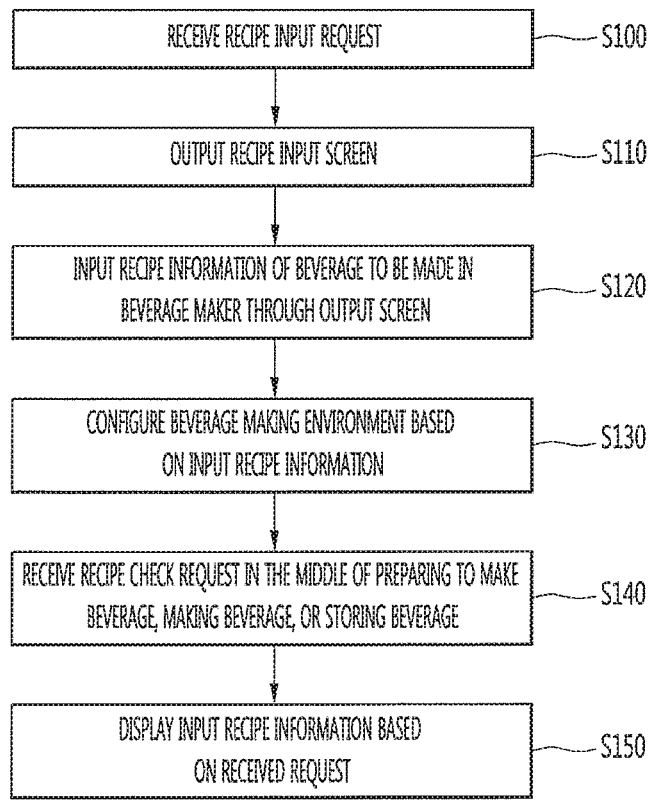
FIG. 3 is a flowchart of an operation of providing recipe information in the beverage maker according to an embodiment.

FIG. 3 is a flowchart to explain an embodiment of an operation of providing recipe information in the beverage maker. In the following description, it is assumed that the input interface 120 of the beverage maker is the rotary knob 122, and the output interface 130 is the display 132; however, embodiments are not limited thereto.

Referring to FIG. 3, the beverage maker may receive a recipe input request from a user (S100), and may output a recipe input screen through the display 132 in response to the received request (S110). When a request for execution of a beverage making function is received, the beverage maker may obtain recipe information of a beverage to be made. The recipe information may include a plurality of ingredients, and characteristic information, such as a level of carbonic acid, for example, of the beverage to be made.

In this case, the beverage maker may obtain recipe information when any one of a plurality of recipes already registered is selected. Alternatively, when the user intends to input recipe information different from the registered recipes, the beverage maker may receive the recipe input request from the user. In response to the received request, the beverage maker may display the recipe input screen through the display 132 to receive input of recipe information from the user.

The beverage maker may receive input of recipe information of the beverage to be made in the beverage maker through the output recipe input screen (S120). The beverage maker may display at least one recipe input screen for receiving input of recipe information from the user in sequence.

For example, the recipe input screens may be displayed according to an ingredient category. The user may select an ingredient in each ingredient category through the recipe input screens displayed in sequence.

When the beverage to be made is beer, the ingredient category may include malt (wort), yeast, hop, and/or flavor additives. In this case, the beverage maker may display, in sequence, a recipe input screen for selecting a kind of malt (wort), a recipe input screen for selecting a kind of yeast, a recipe input screen for selecting a combination of hop and flavor additives, and at least one recipe input screen for selecting a kind of hop and/or a kind of flavor additive according to a selected combination. The user may input recipe information of the beverage to be made by selecting malt, yeast, hop and/or flavor additives based on the recipe input screens. In addition, the beverage maker may receive input of a beverage characteristic, such as a level of carbonic acid, for example, through the recipe input screen.

According to an embodiment, the beverage maker may receive recipe information from a terminal of the user through the communication interface 110. For example, the user may input the recipe information through an application of the user's terminal, and the terminal may transmit the input recipe information to the beverage maker.

The beverage maker may configure a making environment of the beverage based on the input recipe information (S130). The beverage maker may obtain the recipe information from the user through the recipe input screen, and may configure the making environment of the beverage based on the obtained recipe information. For example, the controller 150 may configure the making environment, such as time, temperature, and/or pressure, for example, with respect to each of the operations included in the making of the beverage, based on information of ingredients included in the obtained recipe information and the beverage characteristic.

According to an embodiment, the controller 140 may transmit information regarding the configured making environment to the terminal of the user or a server through the communication interface 110.

The beverage maker may receive a recipe check request from the user in the middle of or while preparing to make the beverage, making the beverage, or storing the beverage (S140). The beverage maker may configure the making environment based on the obtained recipe information, and may initiate making of the beverage after ingredients are put into the beverage maker.

The beverage maker may receive the recipe check request from the user prior to initiating making of the beverage (in the middle of or while preparing to make the beverage). For example, the user may want to check whether ingredients to be input and ingredients of the recipe information match each other when putting the ingredients into the beverage maker. In this case, the user may input the recipe check request into the beverage maker through the input interface 120.

The beverage maker may receive the recipe check request from the user in the middle of or while making the beverage or storing the made beverage. For example, when the user forgets the recipe information of the beverage which is being made or stored, the user may input the recipe check request into the beverage maker through the input interface 120 to check the recipe information.

The beverage maker may receive the recipe check request from the terminal of the user through the communication interface 110. The beverage maker may output the recipe information, which is input at S120, through the display 132 based on the received recipe check request (S150). The user may check the recipe information currently input to the beverage maker, or may easily check the recipe information regarding the beverage which is being made or stored, through the output recipe information.

The controller 150 may transmit the recipe information to the user's terminal or the server through the communication interface 110. Accordingly, the user may easily check the recipe information through the terminal at a location at a distance from the beverage maker.

Hereinafter, examples of operations of the beverage maker described above in FIG. 3 will be described with reference to FIGS. 4A to 7C. FIGS. 4A to 4F are example views to explain a process of obtaining recipe information regarding a beverage to be made when the beverage maker executes the beverage making function.

When a request for execution of the beverage making function is received from the user, the beverage maker may display screens for obtaining recipe information of the beverage to be made. For example, the beverage maker may obtain recipe information through pre-set recipes (standard recipe), or may obtain recipe information including ingredients or a beverage characteristic directly input by the user. That is, the beverage maker may obtain recipe information through different screens according to a recipe input type.

Figure 4A:
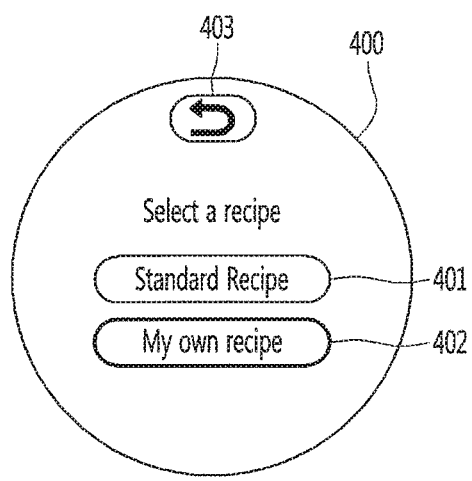
FIGS. 4A to 4F are example views to explain a process of obtaining recipe information regarding a beverage to be made when the beverage maker executes a beverage making function.

Referring to FIG. 4A, the controller 150 may display a recipe selection screen 400 for determining a recipe input type through the display 132. The recipe selection screen 400 may include a first item 401, for example, a "standard recipe" item, for obtaining recipe information through already registered standard recipes, and a second item 402, for example, an item of "my own recipe, for obtaining recipe information through a recipe set by the user, for example. The recipe selection screen 400 may further include a third item 403 to return to a previous screen.

For example, any one of the items 401-403 may be highlighted by operating the rotary knob 122. The highlighted item may be changed by the user turning the rotary knob 122. The highlighted item may be selected by operating, for example, pressing, the rotary knob 122.

When the first item 401 is selected, the controller 150 may display a screen including a list of already registered recipes although the screen is not illustrated. The user may select any one of the recipes included in the list by operating the rotary knob 122. The controller 150 may obtain the selected recipe as the recipe information.

On the other hand, when the second item 402 is selected, the controller 150 may display recipe input screens 410-440 for obtaining ingredients of a beverage to be made and a beverage characteristic from the user, as shown in FIGS. 4B to 4E. For example, the recipe input screens 410-440 may include ingredient selection screens 410, 420, 430 and a characteristic setting screen 440, but may be variously changed based on a kind of beverage to be made.

Figure 4B:
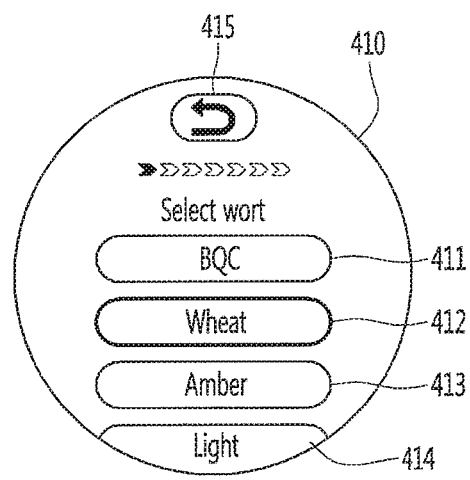
Figure 4C:
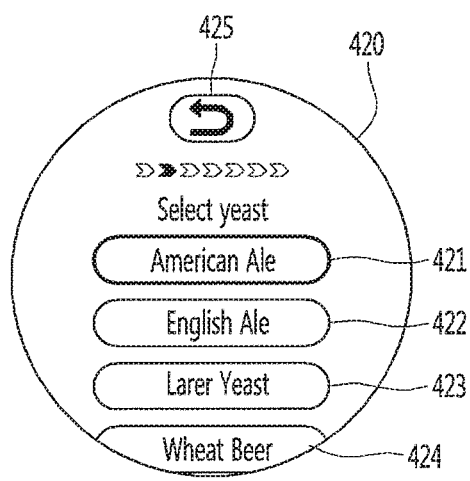
Figure 4D:
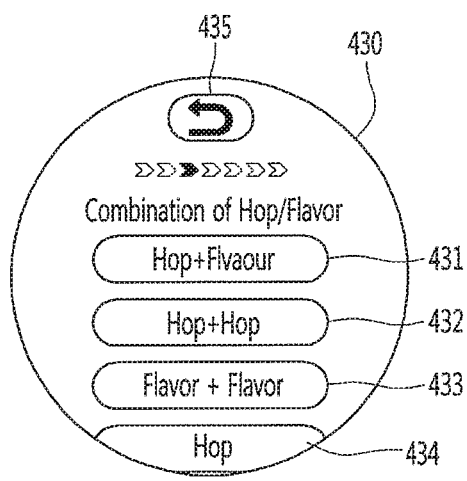

Referring to FIGS. 4B to 4D, when the beverage to be made is beer, the beverage maker may display the ingredient selection screens 410-430 to obtain information of wort (or malt), yeast, and hop and flavor additives (or hop and hop, a flavor additive and a flavor additive), as ingredient information of beer. In addition, the beverage maker may display the characteristic setting screen 440 to set a characteristic, for example, a level of carbonic acid, of the beverage to be made. The ingredient selection screens 410-430 and the characteristic setting screen 440 may be displayed in sequence according to a set or predetermined order. Hereinafter, the ingredient selection screens 410-430 and the characteristic setting screen 440 will be described, respectively.

Referring to FIG. 4B, the controller 150 may display a wort selection screen 410 to obtain information of wort (or malt). The wort selection screen 410 may include a list of a plurality of kinds of wort 411-414, and the user may select wort to input when the beverage is made, from the plurality of kinds of wort 411-414.

Referring to FIG. 4C, the controller 150 may display a yeast selection screen 420 to obtain information of yeast. Similarly to the wort selection screen 410, the yeast selection screen 420 may include a list of a plurality of kinds of yeast 421-424, and the user may select yeast to input when the beverage is made, from the plurality of kinds of yeast 421-424.

Referring to FIG. 4D, the controller 150 may display a hop/flavor combination screen 430 to select a combination of hop and flavor additives. The hop/flavor combination screen 430 may include a list having a first combination 431 of hop and a flavor additive, respectively, a second combination 432 of two different kinds of hop, a third combination 433 of two different kinds of flavor additives, and a fourth combination 434 of only hop. The combinations included in the list may be variously changed.

When any one combination is selected by the user, the controller 150 may display a selection screen similar to the wort selection screen 410 and the yeast selection screen 420 to obtain information of ingredients of the selected combination. For example, when the first combination 431 is selected, the controller 150 may display a hop selection screen and a flavor additive selection screen to obtain information on the hop and the flavor additive.

Figure 4E:
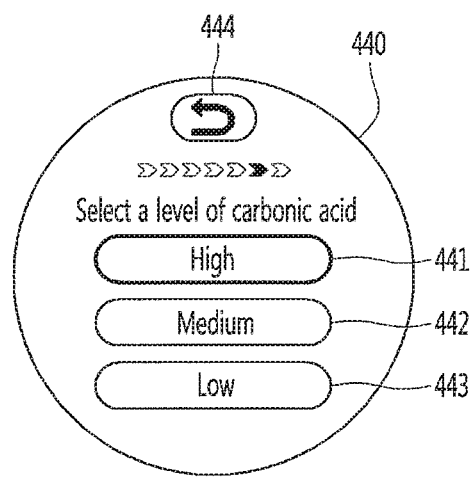

When the ingredient information is obtained through the screens of FIGS. 4B to 4D, the controller 150 may display the characteristic setting screen, for example, a carbonic acid setting screen 440, to set a characteristic, a level of carbonic acid, for example, of the beverage to be made as shown in FIG. 4E. Although FIG. 4E illustrates the carbonic acid selection screen 440 as an example of the characteristic setting screen, the characteristic setting screen may be variously changed according to a kind of a beverage to be made. The user may set a level of carbonic acid of the beverage to be made to any one of a high level 441, a medium level 442, and a low level 443 through the carbonic acid selection screen 440.

Figure 4F:
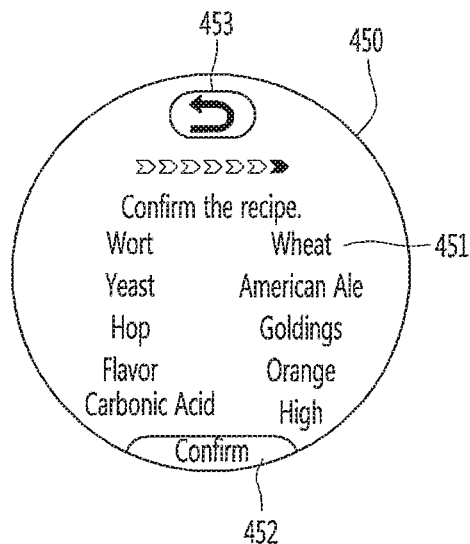

Referring to FIG. 4F, the controller 150 may display a recipe confirmation screen 450 to confirm whether the ingredient information and the beverage characteristic are correctly selected. The recipe confirmation screen 450 may indicate recipe information 451 including the ingredients and the characteristic selected through the screens of FIGS. 4B to 4E.

When the ingredients and the beverage characteristic are correctly selected, the user may select a confirmation item 452 of the recipe confirmation screen 450. When the confirmation item 452 is selected, the controller 150 may obtain recipe information of the beverage to be made, based on the selected ingredients and beverage characteristic.

Figure 5A:
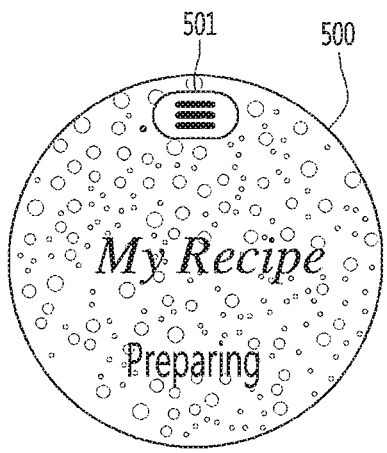
FIGS. 5A to 5C are example views to explain an operation of providing recipe information according to a user's request when the beverage maker is preparing to make a beverage.
Figure 5B:
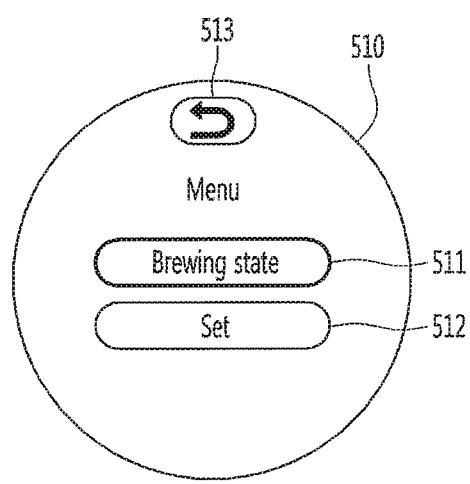
Figure 5C:
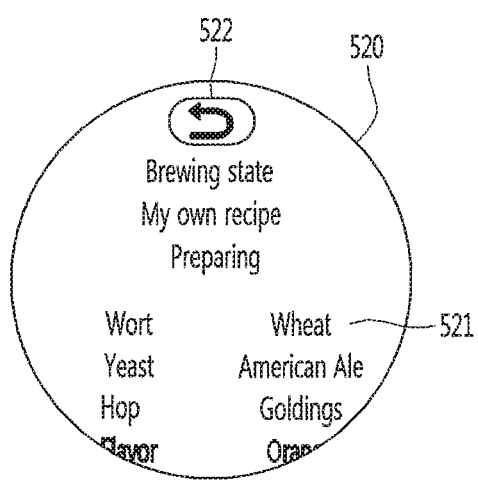

FIGS. 5A to 5C are example views to explain an operation of providing recipe information according to a user's request when the beverage maker is in the middle of or while preparing to make a beverage. Referring to FIG. 5A, when recipe information of a beverage to be made is obtained, the beverage maker may configure a making environment of the beverage maker based on the obtained recipe information, and may wait for the input of ingredients.

Being in the middle of or while preparing to make a beverage may refer to a period between a time at which recipe information of the beverage is obtained and a time at which making of the beverage is initiated. For example, when the beverage to be made is beer, being in the middle of or while preparing to make the beverage may refer to a period between a time at which recipe information of the beverage is obtained and a time at which a fermentation operation of the beverage is initiated.

The controller 150 may display a preparation screen 500 indicating that making of the beverage is being prepared through the display 132. For example, the preparation screen 500 may include a recipe name, or a beverage to be made based on set recipe information, a graphic image indicating a characteristic, such as color, or a level of carbonic acid, for example, of the beverage, and a menu item 501 for entering a menu.

When the set recipe information corresponds to a recipe pre-set in the beverage maker, the controller 150 may display a recipe name corresponding to the name of the pre-set recipe. On the other hand, when the set recipe information is recipe information input by the user, the controller 150 may display a recipe name indicating that the recipe information is input by the user.

In addition, the controller 150 may display a graphic image indicating the characteristic of the beverage to be made, based on the ingredients and the beverage characteristic included in the set recipe information. For example, the graphic image may indicate color, or a level of carbonic acid of the beverage, for example; however, embodiments are not limited thereto.

Referring to FIGS. 5A to 5C, the user may want to check recipe information when the beverage maker is in the middle of or during preparing to make the beverage. In this case, the user may select the menu item 501 of the preparation screen 500 by operating the input interface, for example, the rotary knob 122.

The controller 150 may display a menu screen 510 through the display 132 in response to a selection input of the menu item 501. For example, the menu screen 510 may include a first menu item 511 to provide recipe information, a second menu item 512 for setting in relation to making of the beverage, and a back item 513 to return to the preparation screen 500; however, embodiments are not limited thereto.

The user may input a recipe check request into the beverage maker by selecting the first menu item 511 by operating the rotary knob 122. When the first menu item 511 is selected, the controller 150 may display a screen 520 including currently set recipe information 521 through the display 132. The user may easily check the recipe information currently set in the beverage maker, based on the recipe information 521 included in the screen 520. When a portion of the recipe information 521 is not displayed on the screen 520, as described in FIG. 5C, the user may check the hidden portion of the recipe information 521 by scrolling the screen 520 by operating, for example, turning, the rotary knob 122.

After checking the recipe information 521, the user may select the back item 522. When the back item 522 is selected, the controller 150 may display the menu screen 510 or the preparation screen 500 again.

Figure 6A:
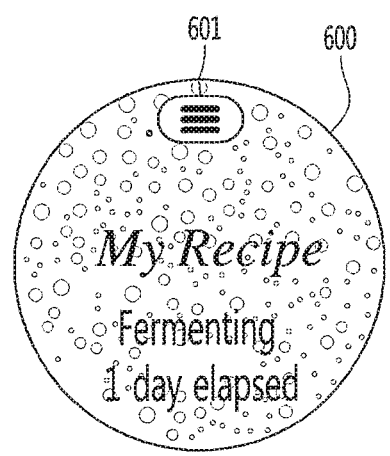
FIGS. 6A to 6C are example views to explain an operation of providing recipe information according to a user's request when the beverage maker is making a beverage.
Figure 6B:
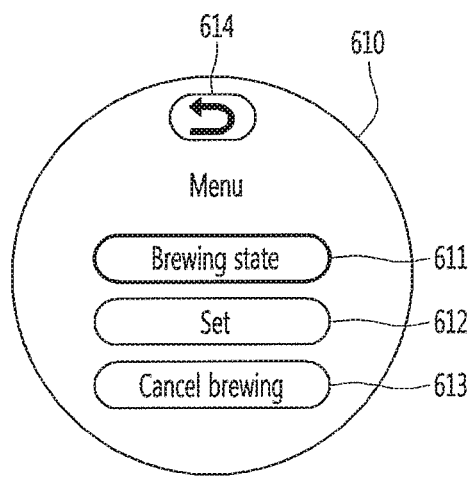
Figure 6C:
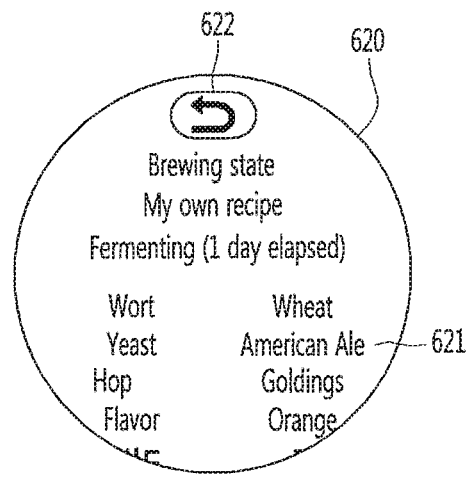

FIGS. 6A to 6C are example views to explain an operation of providing recipe information according to a user's request when the beverage maker is in the middle of or while making a beverage. Referring to FIG. 6A, the beverage maker may configure a making environment according to obtained recipe information, and may initiate making of a beverage after ingredients are input. Being in the middle of or while making a beverage may refer to a period between initiation of making of the beverage and completion of the making. For example, when the beverage to be made is beer, being in the middle of or while making the beverage may refer to a period between a time at which a fermentation operation is initiated and a time at which an aging operation is completed.

The controller 150 may display a making state screen 600 indicating that the beverage is being made through the display 132. For example, the making state screen 600 may include a recipe name, or a beverage name, based on set recipe information, a graphic image indicating a beverage characteristic, information regarding a current making process, or making state information, and a menu item 601 for entering a menu.

When the set recipe information corresponds to a recipe pre-set in the beverage maker as described in FIG. 5A, the controller 150 may display a recipe name corresponding to the name of the pre-set recipe. On the other hand, when the set recipe information is recipe information input by the user, the controller 150 may display a recipe name indicating that the recipe information is input by the user.

In addition, the controller 150 may display the graphic image indicating characteristics of the beverage which is being made, based on ingredients included in the set recipe information and the beverage characteristic. For example, the graphic image may indicate color, and/or a level of carbonic acid of the beverage; however, embodiments are not limited thereto.

Also, the controller 150 may display a current making process of the beverage, based on an elapsed time to make the beverage, a temperature or a pressure in the fermentation tank of the fermentation module 1, and/or a current control state of components related to making of the beverage, for example. For example, when it is identified that the current making process is the fermentation process, the controller 150 may display that the beverage is being currently fermented through the making state screen 600.

Referring to FIGS. 6A to 6C, the user may want to check the recipe information when the beverage maker is in the middle of or while making the beverage. In this case, the user may select the menu item 601 of the making state screen 600 by operating the rotary knob 122.

The controller 150 may display a menu screen 610 through the display 132 in response to a selection input of the menu item 601. For example, the menu screen 610 may include a first menu item 611 to provide recipe information, a second menu item 612 for setting in relation to the operation of the beverage maker, a third menu item 613 to cancel making of the beverage, and a back item 614 to return to the making state screen 600; however, embodiments are not limited thereto.

The user may input a recipe check request to the beverage maker by selecting the first menu item 611 by operating the rotary knob 122. When the first menu item 611 is selected, the controller 150 may display a screen 620 including currently set recipe information 621 through the display 132. The user may easily check the recipe information currently set in the beverage maker, based on the recipe information 621 included in the screen 620. When a portion of the recipe information 621 is not displayed on the screen 620, as shown in FIG. 6C, the user may check the hidden portion of the recipe information 621 by scrolling the screen 620 by operating, for example, turning, the rotary knob 122.

After checking the recipe information 621, the user may select the back item 622. When the back item 622 is selected, the controller 150 may display the menu screen 610 or the making state screen 600 again.

Figure 7A:
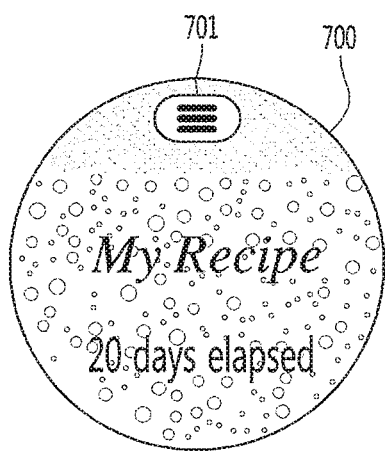
FIGS. 7A to 7C are example views to explain an operation of providing recipe information according to a user's request when the beverage maker is storing a beverage.
Figure 7B:
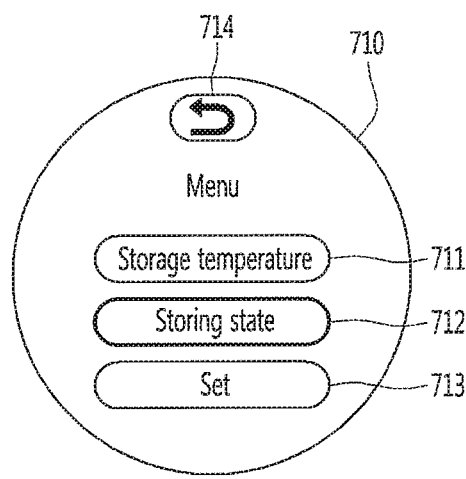
Figure 7C:
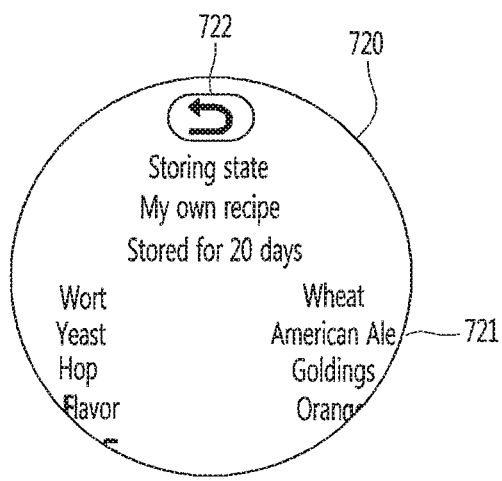

FIGS. 7A to 7C are example views to explain an operation of providing recipe information according to a user's request when the beverage maker is in the middle of or while storing a beverage. Referring to FIG. 7A, the beverage maker may store a made beverage in the fermentation module 1 after completing making of the beverage.

The controller 150 may display a storage state screen 700 indicating that the beverage is being stored through the display 132. For example, the storage state screen 700 may include a recipe name, or a beverage name, based on set recipe information, a graphic image indicating a characteristic of the beverage, storage state information of the beverage, for example, a storage period, or a storage temperature, for example, and a menu item 701 for entering a menu.

When the set recipe information corresponds to a recipe pre-set in the beverage maker as described in FIG. 5A, the controller 150 may display a recipe name corresponding to the name of the pre-set recipe. On the other hand, when the set recipe information is recipe information input by the user, the controller 150 may display a recipe name indicating that the recipe information is input by the user.

In addition, the controller 150 may display the graphic image indicating characteristics of the beverage which is being stored, based on ingredients included in the set recipe information and the beverage characteristic. For example, the graphic image may indicate color, and/or a level of carbonic acid of the beverage; however, embodiments are not limited thereto.

In addition, the controller 150 may display the storage state information indicating a time elapsed from the time at which making of the beverage is completed, and a temperature or a state of the beverage which is being stored. For example, when 20 days has elapsed from the time when making of the beverage is completed, the controller 150 may display the storage state information indicating that 20 days has elapsed from the time of making the beverage through the storage state screen 700.

Referring to FIGS. 7A to 7C, the user may want to check the recipe information when the beverage maker is in the middle of or while storing the beverage. In this case, the user may select the menu item 701 of the storage state screen 700 by operating the rotary knob 122.

The controller 150 may display a menu screen 710 through the display 132 in response to a selection input of the menu item 701. For example, the menu screen 710 may include a first menu item 711 to adjust the temperature of the beverage which is being stored, a second menu item 712 to provide recipe information of the beverage which is being stored, a third menu item 713 for setting in relation to the operation of the beverage maker, and a back item 714 to return to the storage state screen 700, for example; however, embodiments are not limited thereto.

The user may input a recipe check request to the beverage maker by selecting the second menu item 712 by operating the rotary knob 122. When the second menu item 712 is selected, the controller 150 may display a screen 720 including currently set recipe information 721 through the display 132. The user may easily check the recipe information currently set in the beverage maker, based on the recipe information 721 included in the screen 720. When a portion of the recipe information 721 is not displayed on the screen 720, as shown in FIG. 7C, the user may check the hidden portion of the recipe information 721 by scrolling the screen 720 by operating, for example, turning, the rotary knob 122.

After checking the recipe information 721, the user may select the back item 722. When the back item 722 is selected, the controller 150 may display the menu screen 710 or the storage state screen 700 again.

That is, according to the embodiments illustrated in FIGS. 5A to 7C, the beverage maker may allow the user to check the recipe information that is input before the beverage is made at various points of time, for example, when the beverage maker is in the middle of or while preparing to make the beverage, making the beverage, or storing the beverage. Accordingly, the user may easily check the recipe information whenever the user wants, and may refer to the recipe information when selecting a recipe to make a beverage afterward. Therefore, user convenience may be enhanced.

The beverage maker may additionally provide a variety of information related to ingredients or characteristic included in the recipe information to the user, thereby helping the user easily make a user's favorite beverage using the beverage maker. This will be described hereinafter with reference to FIGS. 8 to 10B.

Figure 8:
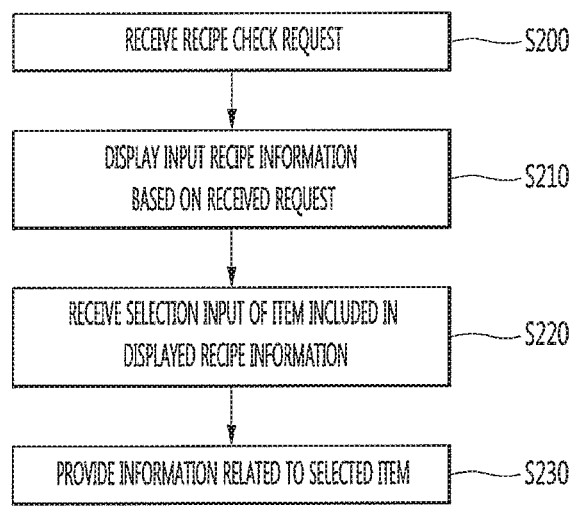
FIG. 8 is a flowchart of an operation of providing information related to an item selected from items included in recipe information in the beverage maker according to an embodiment.

FIG. 8 is a flowchart of an operation of providing information related to an item selected from items included in recipe information in the beverage maker according to an embodiment. Referring to FIG. 8, operations S200 and S210 are substantially the same as operations S140 and S150 described above in FIG. 3, and thus, a detailed description thereof has been omitted.

The beverage maker may receive a selection input of at least one item from items included in recipe information displayed through the display 132 (S220). The controller 150 may display the set recipe information 521, 621, or 721 through the screen 520, 620, or 720 shown in FIG. 5C, 6C, or 7C, respectively.

By selecting at least one item from items of the recipe information 521, 621, or 721 by operating the input interface (rotary knob 122), the user may input a request for detailed information of the selected at least one item. Each of the items may correspond to any one ingredient of a plurality of ingredients included in the recipe information, or may correspond to a beverage characteristic included in the recipe information. The beverage maker may provide detailed information related to the selected at least one item through the output interface 130 (S230).

As described above in FIG. 2, the memory 140 may store detailed information related to each of various ingredients, and detailed information of a beverage characteristic. When the at least one item is selected by the user, the controller 150 may receive a request for provision of detailed information related to the at least one item. Based on the received request, the controller 150 may obtain detailed information related to each of the at least one item from the memory 140, and may provide the obtained detailed information through the output interface, for example, the display 132.

The controller 150 may transmit the information regarding the selected at least one item to the terminal of the user through the communication interface 110. The terminal may provide the detailed information related to each of the at least one item to the user, based on the received information.

Figure 9A:
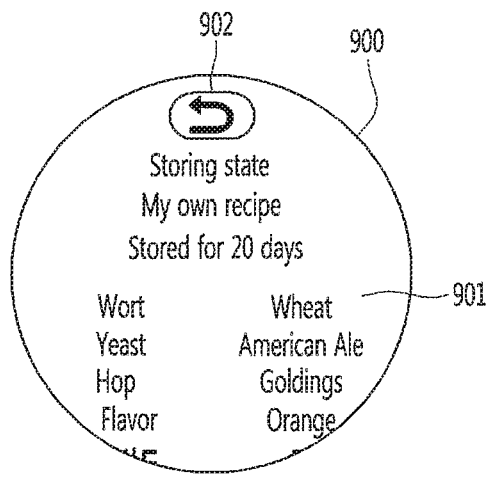
FIGS. 9A to 10B are example views related to operations of the beverage maker illustrated in FIG. 8.

FIGS. 9A to 10B are examples views related to operations of the beverage maker shown in FIG. 8. Referring to FIG. 9A, when a recipe check request is received, the controller 150 may display a screen 900 including recipe information 901. The screen 900 shown in FIG. 9A is substantially the same as the screen 720 shown in FIG. 7C, and thus, a detailed description thereof has been omitted.

Figure 9B:
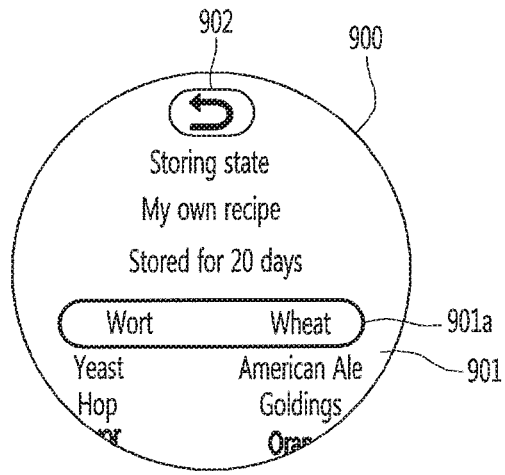

Referring to FIG. 9B, the user may select a desired item in the recipe information 901 included in the storage state screen 900 by operating the rotary knob 122. For example, any one of the items included in the recipe information 901 may be highlighted according to an operation of the rotary knob 122. According to the user's turning of the rotary knob 122, the highlighted item may be changed. The highlighted item may be selected by operating, for example, pressing, the rotary knob 122.

Figure 9C:
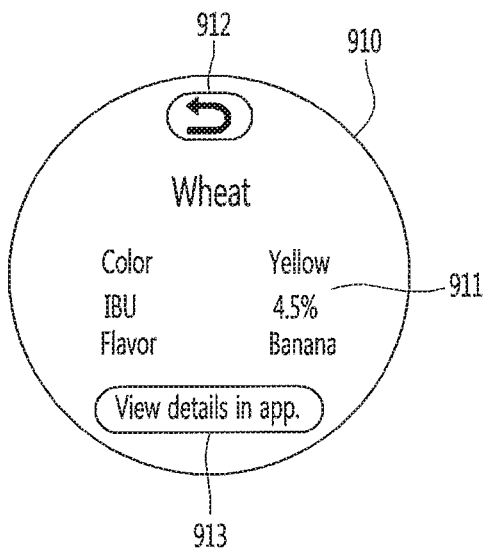

Referring to FIG. 9C, when a predetermined item is selected by operating the rotary knob 122, the controller 150 may display a detailed information screen including detailed information regarding an ingredient or a beverage characteristic corresponding to the selected item through the display 132. For example, as shown in FIG. 9B, an item 901a corresponding to "Wheat" may be selected as a kind of wort from the items of the recipe information 901. In this case, the controller 150 may obtain detailed information related to "Wheat" from the memory 140, and may display a detailed information screen 910 including the obtained detailed information 911 through the display 132. The detailed information screen 910 may further include a back item 912 to return to the storage state screen 900.

The user may recognize characteristics of "Wheat" and characteristics of a beverage made using "Wheat," based on the detailed information 911 included in the detailed information screen 910. Accordingly, the user may make a beverage afterward using "Wheat" or other ingredients.

The detailed information screen 910 may further include an item 913 to provide the detailed information through the terminal of the user connected with the beverage maker through the communication interface 110. When the item 913 is selected by operating the rotary knob 122, the controller 150 may transmit the information regarding the selected item 901a, for example, information indicating that the kind of wort is "Wheat", to the terminal through the communication interface 110.

Figure 10A:
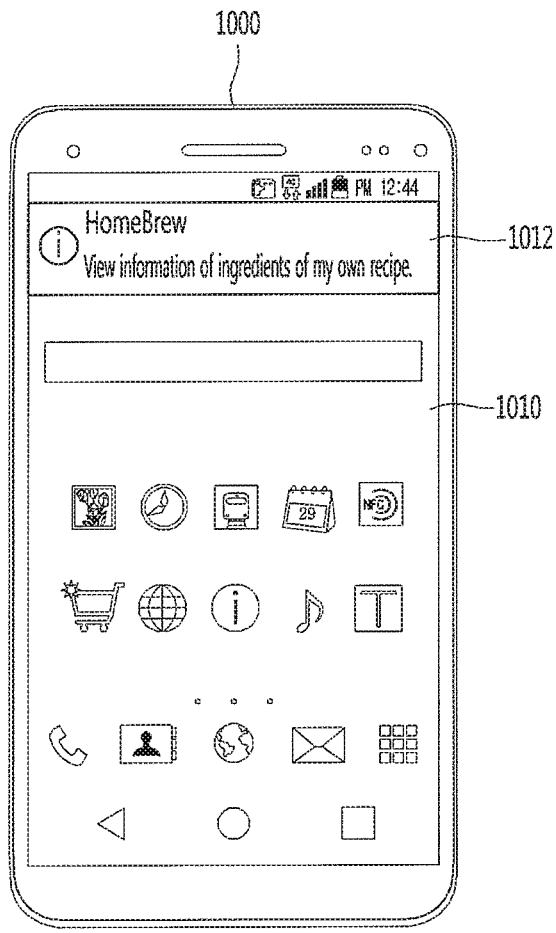

Referring to FIG. 10A, when the terminal 1000 receives the information regarding the selected item 901a from the beverage maker, the terminal 1000 may output a notification 1012 for providing the detailed information related to the selected item 901a through a display 1010. For example, the notification 1012 may be provided in the form of a push notification by overlapping some area of a home screen 1010, for example; however, embodiments are not limited thereto.

Figure 10B:
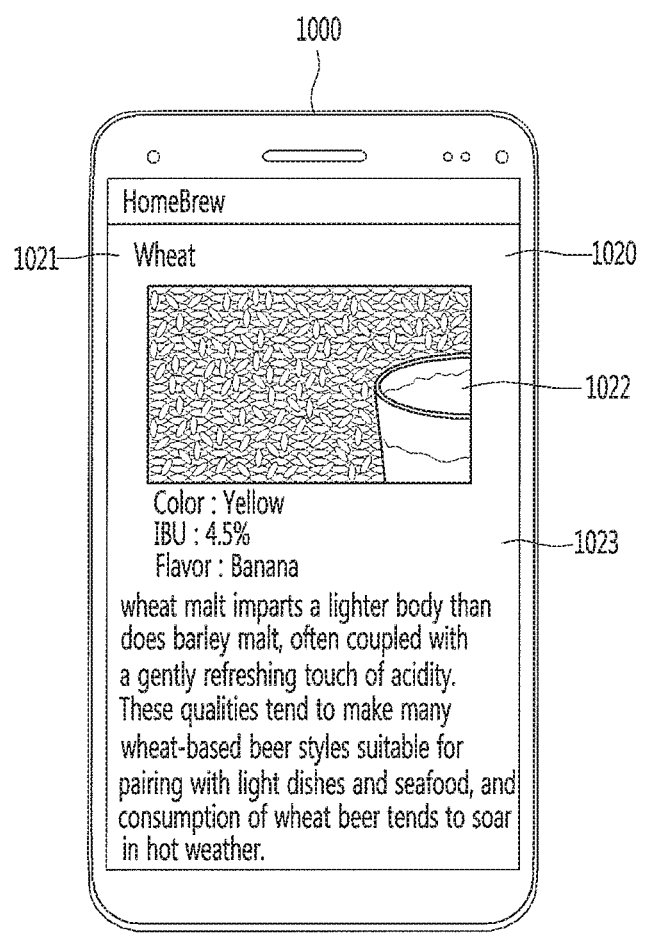

Referring to FIG. 10B, when the notification 1012 is selected by the user, for example, by a touch input, the terminal 1000 may provide the detailed information related to the selected item 901a through a detailed information screen 1020. For example, the detailed information screen 1020 may include a name 1021 of the ingredient corresponding to the item 901a, an image 1022 related to the ingredient, and detailed information 1023 related to the ingredient, for example; however, embodiments are not limited thereto. That is, the beverage maker may effectively provide a variety of information related to at least one item from among items included in recipe information to the user through the terminal 1000, which has a larger display than the display 132 of the beverage maker.

According to various embodiments disclosed herein, the beverage maker may allow the user to check recipe information that is input to make a beverage at various points of time, for example, when the beverage maker is in the middle of preparing to make the beverage, making the beverage, or storing the beverage. Accordingly, the user may easily check the recipe information whenever the user wants. In addition, the beverage maker may provide recipe information and detailed information related to an item included in the recipe information, such that the user may easily make the user's favorite beverage by referring to the information provided by the beverage maker.

In addition, as the beverage maker may communicate with the terminal of the user, recipe information may be provided through various devices in addition to the beverage maker. Accordingly, the user may easily check the recipe information at a location at a distance from the beverage maker.

Embodiments disclosed herein provide a beverage maker which allows a user to easily check recipe information input to make a beverage. Embodiments disclosed herein also provide the beverage maker which may provide a variety of information related to the recipe information to the user.

A beverage maker according to embodiments may include a controller which, when recipe information of a beverage to be made is received, controls a making function of the beverage based on the received recipe information. The controller may receive a recipe check request through an input interface, and may display the recipe information through a display based on the received recipe check request.

The beverage maker may receive the recipe check request in the middle of or while preparing to make the beverage, making the beverage, or storing the made beverage, and may display the recipe information through the display in response to the received request, such that the user may easily check the recipe information whenever the user wants. The beverage maker may display a screen corresponding to each state through the display in the middle of or while preparing to make the beverage, making the beverage, and storing the beverage, and may receive the recipe check request through the displayed screen. That is, the user may easily check the recipe information while easily checking a making or storage state of the beverage based on the displayed screen. The beverage maker may receive a selection input for a certain ingredient from among ingredients included in the recipe information displayed through the display, and may display detailed information related to the certain ingredient through the display based on the received selection input.

The beverage maker may include a communication interface to transmit information regarding the certain ingredient to the terminal in order to provide the detailed information related to the certain ingredient through the terminal of the user. The beverage maker may receive the recipe check request from the terminal through the communication interface, and may transmit the recipe information to the terminal based on the received recipe check request.

The details of one or more implementations are set forth in the accompanying drawings and the description. Other features will be apparent from the description and drawings, and from the claims.

The disclosed subject matter is to be considered illustrative, and not restrictive, and the appended claims are intended to cover all such modifications, enhancements, and other implementations, which fall within the scope. Thus, implementation of embodiments is to be considered illustrative, and not restrictive. Therefore, the scope is defined not by the description but by the appended claims, and all differences within the scope will be construed as being included.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A beer maker, comprising:
 a fermentation tank defining a space to make beer therein;
 a display;
 an input interface configured to receive recipe information of the beer to be made in the fermentation tank; and
 a controller configured to set a making environment of the beer based on the received recipe information, and to control a making function of the beer based on the set making environment, wherein the controller is configured to receive a recipe check request through the input interface, and display the recipe information through the display based on the received recipe check request, wherein the controller is further configured to display a recipe selection screen for determining a recipe input type through the display, wherein the recipe selection screen includes an item for obtaining recipe information through a recipe set by a user, and in response to selection of the item, display in sequence an ingredient selection screen to obtain ingredient information of the beer and a characteristic setting screen to set a characteristic when the item is selected, wherein the characteristic is a level of carbonic acid of the beer, wherein the level of carbonic acid is set via the characteristic setting screen, wherein the controller is configured to receive the recipe check request while at least one of preparing to make the beer, making the beer, or storing the made beer, wherein the controller is configured to display a preparation screen indicating that the making of the beer is being prepared through the display during a period between a time at which the recipe information is obtained and a time at which the making of the beer is initiated, and wherein the preparation screen comprises a recipe name or a beer name based on the recipe information, a graphic image related to the level of carbonic acid of the beer, and a menu item.

2. The beer maker of claim 1, wherein the controller is configured to receive the recipe check request through a menu screen displayed in response to a selection input of the menu item, and to display a screen comprising the recipe information through the display in response to the received recipe check request.

3. The beer maker of claim 1, wherein the controller is configured to display a making state screen indicating that the beer is being made through the display after the making of the beer is initiated, and wherein the making state screen comprises the recipe name or the beer name based on the recipe information, the graphic image related to the level of carbonic acid of the beer which is being made, a current making process, and a menu item.

4. The beer maker of claim 3, wherein the controller is configured to:
 identify the current making process based on an elapsed time to make the beer, or a temperature or a pressure in the fermentation tank;

receive the recipe check request through a menu screen displayed in response to a selection input of the menu item; and display a screen including the recipe information through the display in response to the received recipe check request.

5. The beer maker of claim 1, wherein the controller is configured to display a storage state screen indicating that the beer is being stored through the display after the making of the beer is completed, and wherein the storage state screen comprises the recipe name or the beer name based on the recipe information, the graphic image related to the level of carbonic acid of the beer which is being stored, and storage state information.

6. The beer maker of claim 5, wherein the controller is configured to:

obtain the storage state information comprising at least one of a storage period or a storage temperature of the beer;

receive the recipe check request through a menu screen displayed in response to a selection input of a menu item in the storage state screen; and display a screen comprising the recipe information through the display in response to the received recipe check request.

7. The beer maker of claim 1, wherein the recipe information comprises at least one ingredient for making the beer.

8. The beer maker of claim 7, wherein the controller is configured to:

obtain a selection input for a first ingredient from among the at least one ingredient included in the recipe information through the input interface;

obtain detailed information related to the first ingredient based on the obtained selection input; and output the obtained detailed information through the display.

9. The beer maker of claim 8, further comprising a memory configured to store detailed information related to each of the at least one ingredient, wherein the controller is configured to obtain the detailed information related to the first ingredient from the memory, based on the selection input.

10. The beer maker of claim 8, further comprising a communication interface configured to connect to a terminal, wherein the controller is configured to control the communication interface to transmit information regarding the first ingredient to the terminal to provide the detailed information related to the first ingredient through the terminal.

11. The beer maker of claim 1, further comprising a communication interface configured to connect to a terminal, wherein the controller is configured to receive the recipe check request from the terminal through the communication interface, and to control the communication interface to transmit the recipe information to the terminal based on the received recipe check request.

12. A method for controlling a beer maker, the method comprising:

receiving recipe information of a beer to be made through the beer maker;

setting a making environment of the beer based on the received recipe information; and controlling a making function of the beer based on the set making environment, wherein the controlling the making function comprises:

receiving a recipe check request while at least one of preparing to make the beer, making the beer, or storing the made beer; and displaying the recipe information through a display or transmitting the recipe information to a terminal or a server, based on the received check request, wherein the receiving recipe information of the beer to be made through the beer maker further comprises:

displaying a recipe selection screen for determining a recipe input type through the display, the recipe selection screen including an item for obtaining recipe information through a recipe set by a user; and in response to selection of the item, displaying in sequence an ingredient selection screen to obtain ingredient information of the beer and a characteristic setting screen to set a characteristic when the item is selected, wherein the characteristic is a level of carbonic acid of the beer, wherein the level of carbonic acid is set via the characteristic setting screen, wherein the method, further comprising displaying a preparation screen indicating that the making of the beer is being prepared through the display during a period between a time at which the recipe information is obtained and a time at which the making of the beer is initiated, wherein the preparation screen comprises a recipe name or a beer name based on the recipe information, a graphic image related to the level of carbonic acid of the beer to be made, and a menu item, and wherein the receiving the recipe check request comprises:

receiving the recipe check request through a menu screen displayed in response to a selection input of the menu item, during the preparing to make the beer; and in response to the received recipe check request, displaying a screen comprising the recipe information through the display, or transmitting the recipe information to the terminal or the server.

13. The method of claim 12, wherein the controlling the making function of the beer comprises:

displaying a making state screen indicating that the beer is being made through the display after the making of the beer is initiated; and identifying a current making process based on an elapsed time to make the beer, or a temperature or a pressure in a fermentation tank, wherein the making state screen comprises the recipe name or the beer name based on the recipe information, the graphic image related to the level of carbonic acid of the beer which is being made, the current making process, and a menu item, and wherein the receiving the recipe check request comprises:

receiving the recipe check request through a menu screen displayed in response to a selection input of the menu item, during the making of the beer; and in response to the received recipe check request, displaying a screen comprising the recipe information through the display, or transmitting the recipe information to the terminal or the server.

14. The method of claim 12, wherein the controlling the making function of the beer comprises:

after completing the making of the beer, displaying a storage state screen indicating that the beer is being stored through the display; and obtaining storage state information comprising at least one of a storage period or a storage temperature of the beer, wherein the storage state screen comprises the recipe name or the beer name based on the recipe information, the graphic image related to the level of carbonic acid of the beer which is being stored, the storage state information, and a menu item, and wherein the receiving the recipe check request comprises:
- receiving the recipe check request through a menu screen displayed in response to a selection input of the menu item; and
- in response to the received recipe check request, displaying a screen comprising the recipe information through the display, or transmitting the recipe information to the terminal or the server.

15. The method of claim 12, wherein the recipe information comprises at least one ingredient for making the beer.

16. The method of claim 15, wherein the receiving the recipe information comprises:
- obtaining a selection input for a first ingredient from among the at least one ingredient included in the recipe information;
- obtaining detailed information related to the selected first ingredient; and
- displaying the obtained detailed information through the display.

17. A beer maker, comprising:
- a fermentation tank defining a space to make beer therein;
- a fluid supply module configured to supply a fluid to the fermentation tank;
- an ingredient supplier configured to supply at least one ingredient to the fermentation tank;
- a display;
- an input interface configured to receive recipe information of the beer to be made in the fermentation tank; and
- a controller configured to control the fermentation tank, the fluid supply module, and the ingredient supplier based on the received recipe information to make the beer, wherein the controller is configured to receive a recipe check request through the input interface while at least one of preparing to make the beer, making the beer, or storing the made beer, and display the recipe information through the display based on the received recipe check request, wherein the controller is further configured to display a recipe selection screen for determining a recipe input type through the display, wherein the recipe selection screen includes an item for obtaining recipe information through a recipe set by a user, and in response to selection of the item, display in sequence an ingredient selection screen to obtain ingredient information of the beer and a characteristic setting screen to set a characteristic when the item is selected, wherein the characteristic is a level of carbonic acid of the beer, wherein the level of carbonic acid is set via the characteristic setting screen, wherein the controller is configured to display a preparation screen indicating that the making of the beer is being prepared through the display during a period between a time at which the recipe information is obtained and a time at which the making of the beer is initiated, and wherein the preparation screen comprises a recipe name or a beer name based on the recipe information, a graphic image related to the level of carbonic acid of the beer, and a menu item.

* * * * *